United States Patent
Nagata

(10) Patent No.: US 8,908,222 B2
(45) Date of Patent: Dec. 9, 2014

(54) APPARATUS THAT INHIBITS LEAVING AND FORGETTING OF ORIGINALS

(75) Inventor: Naohisa Nagata, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 13/597,829

(22) Filed: Aug. 29, 2012

(65) Prior Publication Data

US 2013/0057920 A1  Mar. 7, 2013

(30) Foreign Application Priority Data

Sep. 7, 2011  (JP) ................... 2011-195347

(51) Int. Cl.
- *G06K 15/00* (2006.01)
- *H04N 1/00* (2006.01)
- *H04N 1/44* (2006.01)
- *H04N 1/32* (2006.01)

(52) U.S. Cl.
CPC ....... *H04N 1/00411* (2013.01); *H04N 1/00506* (2013.01); *H04N 1/00432* (2013.01); *H04N 1/4426* (2013.01); *H04N 1/444* (2013.01); *H04N 1/00424* (2013.01); *H04N 2201/3226* (2013.01); *H04N 2201/3208* (2013.01); *H04N 2201/3202* (2013.01); *H04N 2201/3273* (2013.01); *H04N 1/00477* (2013.01); *H04N 2201/3214* (2013.01); *H04N 2201/3219* (2013.01); *H04N 1/00472* (2013.01); *H04N 1/00482* (2013.01); *H04N 2201/3215* (2013.01); *H04N 2201/3205* (2013.01); *H04N 1/00474* (2013.01); *H04N 1/32112* (2013.01); *H04N 2201/0094* (2013.01)

USPC ............. 358/1.16; 358/1.1; 399/80; 399/405; 399/8

(58) Field of Classification Search
CPC .............. H04N 2201/3205; H04N 2201/3219; H04N 2201/3215; H04N 2201/3226; H04N 1/00326; H04N 1/00477
USPC .................. 358/1.16, 1.1; 399/80, 405, 8
See application file for complete search history.

(56) References Cited

U.S. PATENT DOCUMENTS

| 2005/0240711 A1* | 10/2005 | Watanabe | 710/313 |
| 2008/0094645 A1* | 4/2008 | Sato et al. | 358/1.1 |
| 2010/0073740 A1* | 3/2010 | Kojima | 358/474 |

FOREIGN PATENT DOCUMENTS

| JP | 2008-104034 A | 5/2008 |
| JP | 2009-21835 A | 1/2009 |

* cited by examiner

*Primary Examiner* — Jacky X Zheng
(74) *Attorney, Agent, or Firm* — Fitzpatrick, Cella, Harper & Scinto

(57) ABSTRACT

Each user can use an image forming system by performing authentication through an ID card. In a case where a first user does not remove an original even though reading of the original has finished, a user ID of the first user is stored. Next, when a second user removes the original, the user ID of the second user is stored associated with the user ID of the first user. The user ID of the first user who forgot the original and the user ID of the second user who removed this original are outputted, and therefore the first user can more easily discover the original by inquiring to the second user of the whereabouts of the original.

12 Claims, 11 Drawing Sheets

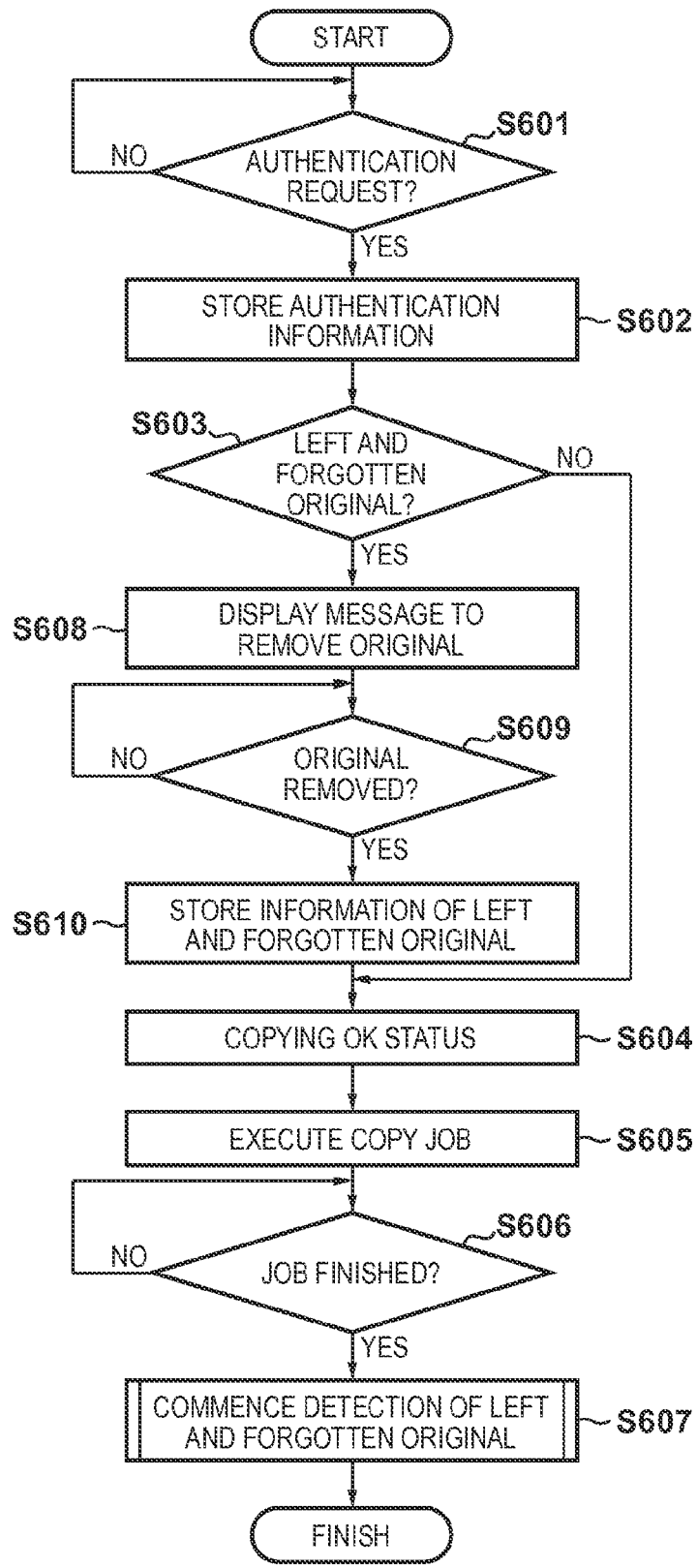

FIG. 7A

| USER ID | DATE | TIME |
|---|---|---|
| A12345 | 2011/10/01 | 9:13 | ~704
| : | : | : |
| : | : | : |

FIG. 7B

| USER ID | DATE | TIME |
|---|---|---|
| E67890 | 2011/10/01 | 10:30 | ~705
| A12345 | 2011/10/01 | 9:13 | ~704
| : | : | : |

FIG. 7C

| ORIGINAL ID | LEAVE-AND-FORGET USER ID | LEAVE-AND-FORGET DATE/TIME | REMOVAL USER ID | REMOVAL DATE/TIME |
|---|---|---|---|---|
| 1 | A12345 | 2011/10/01 9:13 | E67890 | 2011/10/01 10:30 |
| 2 | : | : | : | : |
| : | : | : | : | : |

FIG. 7D

| USER ID | NAME | CONTACT INFORMATION |
|---|---|---|
| A12345 | AA | EXT. 1234 |
| E67890 | BB | aaa@aaa.com |
| : | : | : |

FIG. 8C

| No. | LEAVE-AND-FORGET USER | | | REMOVAL USER | | |
|---|---|---|---|---|---|---|
| | NAME | CONTACT INFORMATION | DATE/TIME | NAME | CONTACT INFORMATION | DATE/TIME |
| 001 | ○○○○ | xxxx | 2011/10/01 9:13 | △△△△ | yyyy | 2011/10/01 10:30 |
| 002 | | | | | | |
| 003 | | | | | | |
| 004 | | | | | | |

LEFT AND FORGOTTEN ORIGINALS HISTORY DISPLAY

CLEAR — 810

RETURN

SYSTEM STATUS/STOP ▷

FIG. 8D

COPY

820

THERE IS A PREVIOUS ORIGINAL THAT HAS BEEN LEFT AND FORGOTTEN

REMOVAL USER

| LEFT AND FORGOTTEN DATE/TIME | NAME | CONTACT INFORMATION | REMOVAL DATE/TIME |
|---|---|---|---|
| 2011/10/01 9:13 | △△ △△ | yyyy | 2011/10/01 10:30 |

804  805  806  807  OK — 811

SYSTEM STATUS/STOP ▷

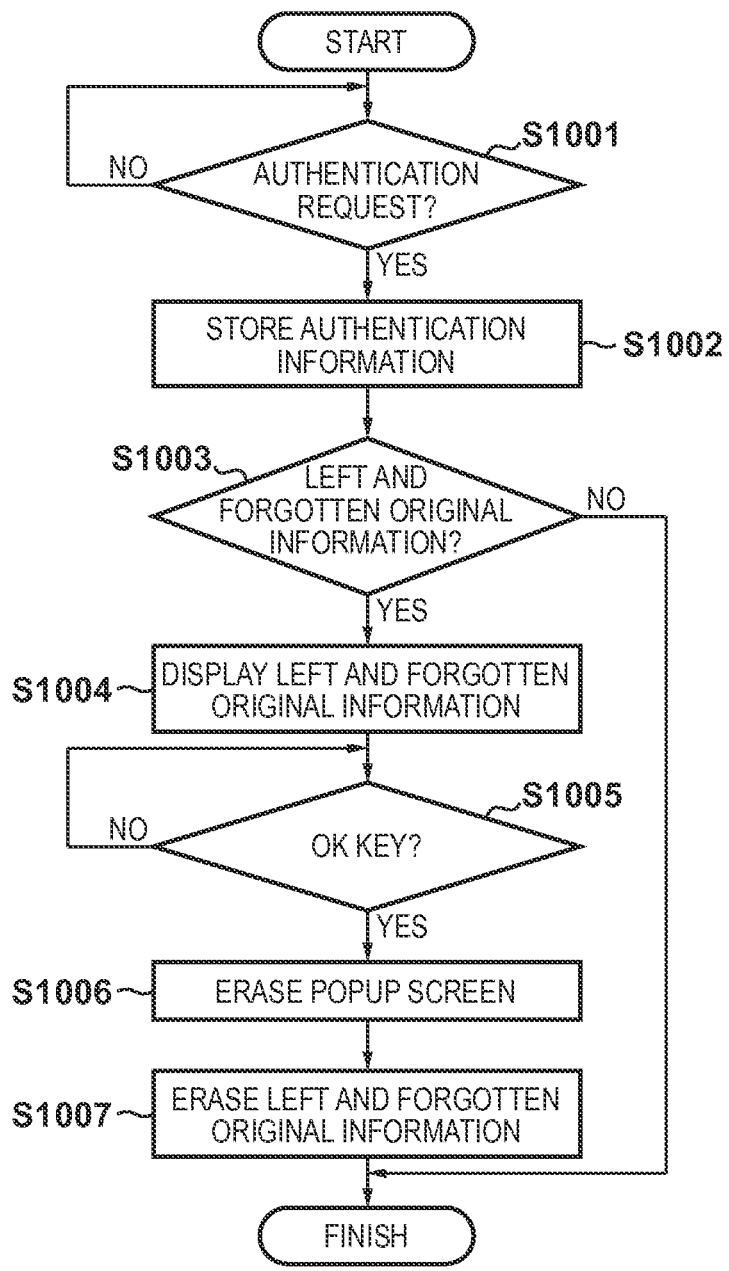

APPARATUS THAT INHIBITS LEAVING AND FORGETTING OF ORIGINALS

BACKGROUND OF THE INVENTION

1. Field of the Invention

The present invention relates to image reading apparatuses and image forming systems that inhibit a user from forgetting to recover an original.

2. Description of the Related Art

Conventionally, in copiers that read an image of an original to generate image data and print the image onto a sheet of paper, after the image of the original has been read, sometimes a user may undesirably forget the original that is left as it is in an image reading portion of the copier. This is referred to as leaving and forgetting an original or forgetting to take an original.

Japanese Patent Laid-Open No. 2008-104034 proposes a copier that prevents important originals from being left and forgotten by sending the user an email attached with an image of the original that has been left and forgotten.

Furthermore, Japanese Patent Laid-Open No. 2009-021835 proposes an image reading apparatus in which user identity information is read from the left and forgotten original such that notification is given of information indicating the user, or information to the effect that the original is left and forgotten is transmitted to a communications terminal of the user.

However, conventional technologies still have problems such as the following. The copier described in Japanese Patent Laid-Open No. 2008-104034 is capable of notifying the user of the left and forgotten original. However, the notified user will not necessarily return immediately to where the copier is installed to collect the original. Accordingly, after an extended time has passed after notification being given, there is a probability that the original will be lost when the user returns to where the copier is installed. For example, in case where another user removes the original from the copier so as to use the copier, there is a probability that the original will be lost undesirably. Unfortunately, if the original is placed somewhere near the copier, the user who left and forgot the original will probably not immediately know where the original has been moved. It is also unfortunately possible after the next user has used an automatic document feeding device that this user will carry away the left and forgotten original together with this user's own original from the original discharge tray.

According to Japanese Patent Laid-Open No. 2009-021835, the user who next uses the image reading apparatus should be able to know to whom the left and forgotten original belongs. However, the user who left and forgot the original cannot ascertain who it was that actually removed the original, and therefore the same problem as Japanese Patent Laid-Open No. 2008-104034 also exists for the invention of Japanese Patent Laid-Open No. 2009-021835.

SUMMARY OF THE INVENTION

Accordingly, a feature of the present invention is to provide an image reading apparatus and an image forming system in which information of a user who has left and forgotten an original and information of a user who has removed the left and forgotten original can be confirmed.

According to one aspect of the present invention, there is provided an image reading apparatus comprising: an obtaining unit configured to obtain identity information of a user; an image reading unit configured to read an image of an original after the obtaining unit has obtained the identity information of the user; a discharge unit configured to discharge the original from which an image has been read by the image reading unit; an original detection unit configured to detect the original that is placed in the discharge unit or the image reading unit; a storage unit configured to store, as left and forgotten original information, identity information of a first user, which was obtained by the obtaining unit prior to the original detection unit detecting the original, associated with identity information of a second user, which was obtained by the obtaining unit when the original detection unit detects the original; and an output unit configured to output the left and forgotten original information stored in the storage unit.

According to another aspect of the present invention, there is provided an image forming system comprising: an image reading apparatus configured to read an image of an original, and an image forming apparatus configured to form on a sheet of paper the image obtained by the image reading apparatus, wherein the image reading apparatus includes: an obtaining unit configured to obtain identity information of a user; an image reading unit configured to read an image of an original after the obtaining unit has obtained the identity information of the user; a discharge unit configured to discharge the original from which an image has been read by the image reading unit; an original detection unit configured to detect the original that is placed in the discharge unit or the image reading unit; a storage unit configured to store, as left and forgotten original information, identity information of a first user, which was obtained by the obtaining unit prior to the original detection unit detecting the original, associated with identity information of a second user, which was obtained by the obtaining unit when the original detection unit detects the original; and an output unit configured to output the left and forgotten original information stored in the storage unit.

Further features of the present invention will become apparent from the following description of exemplary embodiments with reference to the attached drawings.

BRIEF DESCRIPTION OF THE DRAWINGS

FIG. 6 is a flowchart showing a procedure for storing information of a left and forgotten original according to an embodiment.

FIGS. 7A to 7D are diagrams showing a data structure of storage data according to an embodiment.

FIGS. 8A to 8D are diagrams showing screen displays of an operation portion according to an embodiment.

FIG. 10 is a flowchart showing a procedure for displaying information of a left and forgotten original according to an embodiment.

DESCRIPTION OF THE EMBODIMENTS

Figure 1:
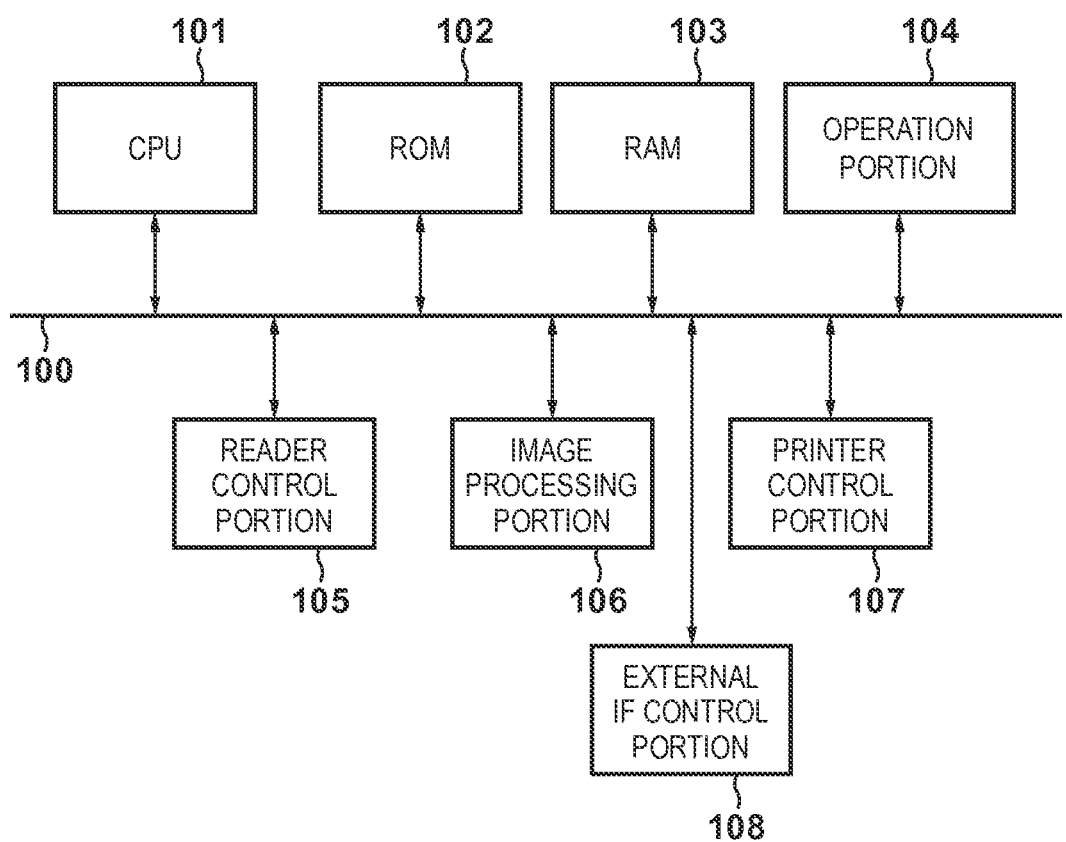
FIG. 1 is a block diagram showing a control portion according to an embodiment.

FIG. 1 is a control block diagram of an image forming system provided with an image reading apparatus and an image forming apparatus. Image forming systems such as this are also sometimes called copiers or multifunction devices.

A CPU 101 is a control unit that performs overall control of the entire image forming system. A ROM 102, on which a control program is written, and a RAM 103, which functions as a work area, are connected to the CPU 101 through a system bus 100 that includes an address bus and a data bus. The ROM 102 may be a nonvolatile memory or a hard disk drive device or the like. An operation portion 104 is provided with an input device for inputting information and an output device for outputting information, and provides a user interface. A reader control portion 105 controls a reader portion, which is an image reading apparatus. An image processing portion 106 carries out various types of image processing on digital data of an original image converted by the reader control portion 105. A printer control portion 107 controls a printer portion, which is an image forming apparatus, and forms an image on paper based on image data outputted from the image processing portion 106. Based on the control program, reading settings and print settings inputted from the operation portion 104, the CPU 101 controls the reader control portion 105 and the printer control portion 107 to execute image forming operations. An external IF control portion 108 connects to an external device, such as a server or a PC, using a LAN cable or a USB cable, and performs sending and receiving of information.

Figure 2:
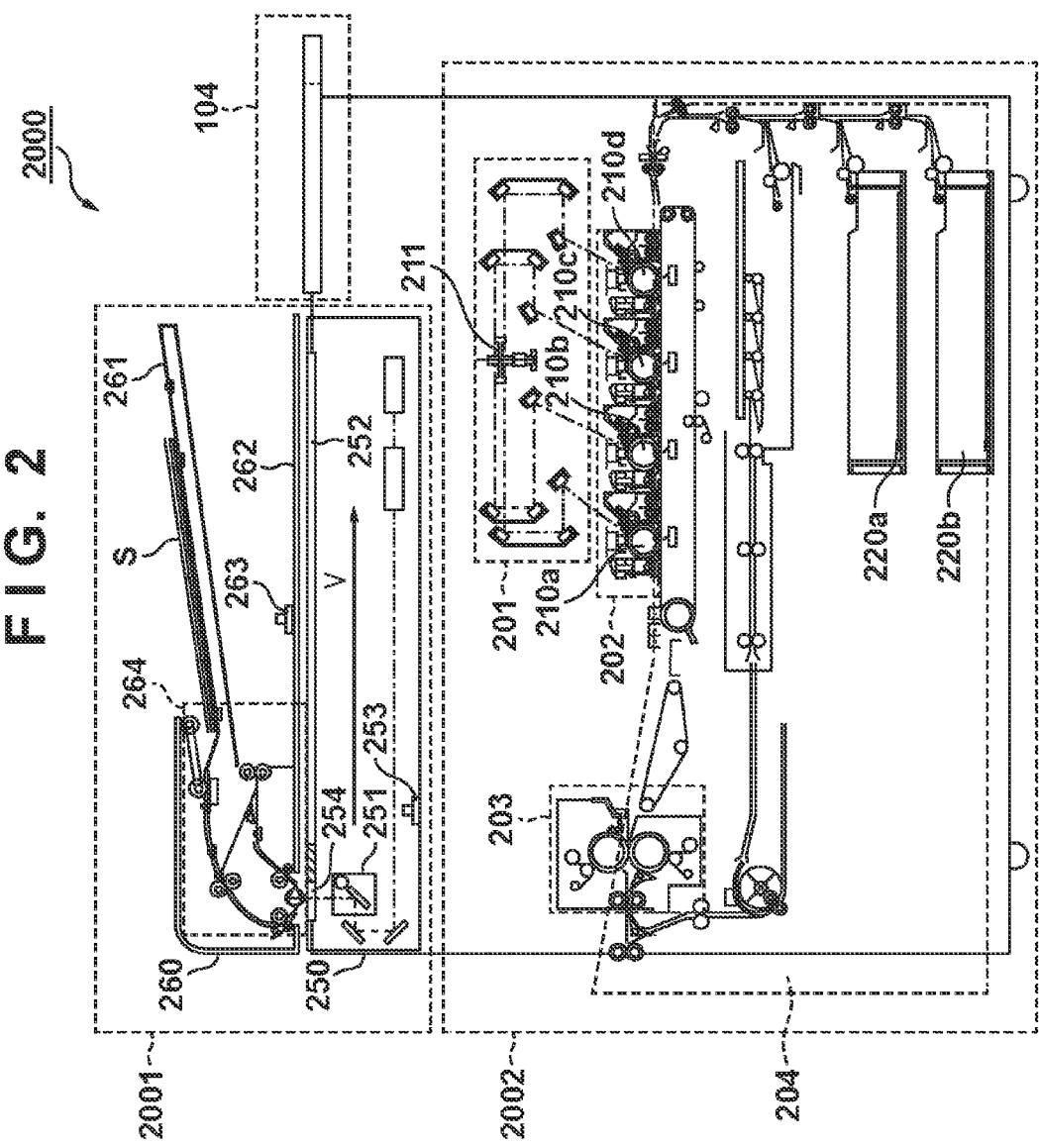
FIG. 2 is a cross-sectional view showing an image forming apparatus according to an embodiment.

FIG. 2 is a cross-sectional view showing one example of an image forming system 2000. The image forming system 2000 is provided with a reader portion 2001, which reads an image of an original, a printer portion 2002, which forms an image on paper, and an operation portion 104. Since the image forming system 2000 is provided with the reader portion 2001, broadly speaking it is an image reading apparatus.

The reader portion 2001 is constituted by an image reading apparatus 250 and an ADF 260. ADF is an abbreviation of "automatic document feeder". The image reading apparatus 250 optically reads an image of an original by irradiating lighting onto the original, then converts the image to electrical signals to generate image data. Modes of reading originals include a mode of reading an original placed on a platen glass 252 and a mode of reading an original conveyed by the ADF 260. In the mode of reading an original on the platen glass 252, the ADF 260 is opened upwardly so that the original can be placed on the platen glass 252. An optical scanner unit 251 moves in the direction of the arrow V and scans the image that has been recorded on the original to generate image data. An original detection sensor 253 detects whether or not an original is present on the platen glass 252, which is a platform for placing an original. In the mode of reading originals using the ADF 260, a reader conveyance portion 264 conveys originals S on an original tray 261 sheet by sheet to an original flow reading glass 254. The optical scanner unit 251 stops below the original flow reading glass 254, as shown in FIG. 1, and reads the image that is recorded on the original being conveyed over the original flow reading glass 254. The original that has been read is discharged by the reader conveyance portion 264 to an original discharge tray 262. A discharged original detection sensor 263 detects whether or not an original is present on the original discharge tray 262, which is a platform for discharged originals. The CPU 101 receives detection results from the original detection sensor 253 and the discharged original detection sensor 263 via the reader control portion 105, and determines whether or not an original has been left and forgotten. The output signal of the original detection sensor 253 and the discharged original detection sensor 263 is high level when an original is detected and low level when an original is not detected.

The printer portion 2002 is an image forming apparatus of an electrophotographic method, but the present invention is also applicable to image forming apparatuses that employ other image forming methods such as an inkjet method, a thermal transfer method, and an electrostatic recording method. This is because the present invention is an invention that does not depend on the image forming method. A laser exposure portion 201 outputs a light beam that is modulated in response to image data generated by the reader portion 2001. A rotating polygon mirror 211 rotates at an equiangular velocity and deflects the incoming light beams. An image forming portion 202 rotationally drives photosensitive drums 210a to 210d and charges these using a charger. The four photosensitive drums 210a to 210d correspond to yellow (Y), magenta (M), cyan (C), and black (K). The light beams that are deflected by the rotating polygon mirror 211 are irradiated onto the photosensitive drums 210a to 210d to form electrostatic latent images. The image forming portion 202 develops the latent images using toner and generates toner images. A feeder/printer conveyance portion 204 conveys paper sheet by sheet from a sheet storage container specified from the operation portion 104 of sheet cassettes 220a and 220b to the image forming portion 202. The image forming portion 202 transfers the toner images onto a sheet of paper. A fixing portion 203 uses heat and pressure to melt the toner on the paper where a toner image has been transferred by the image forming portion 202, thereby fixing the toner image onto the paper.

Figure 3:
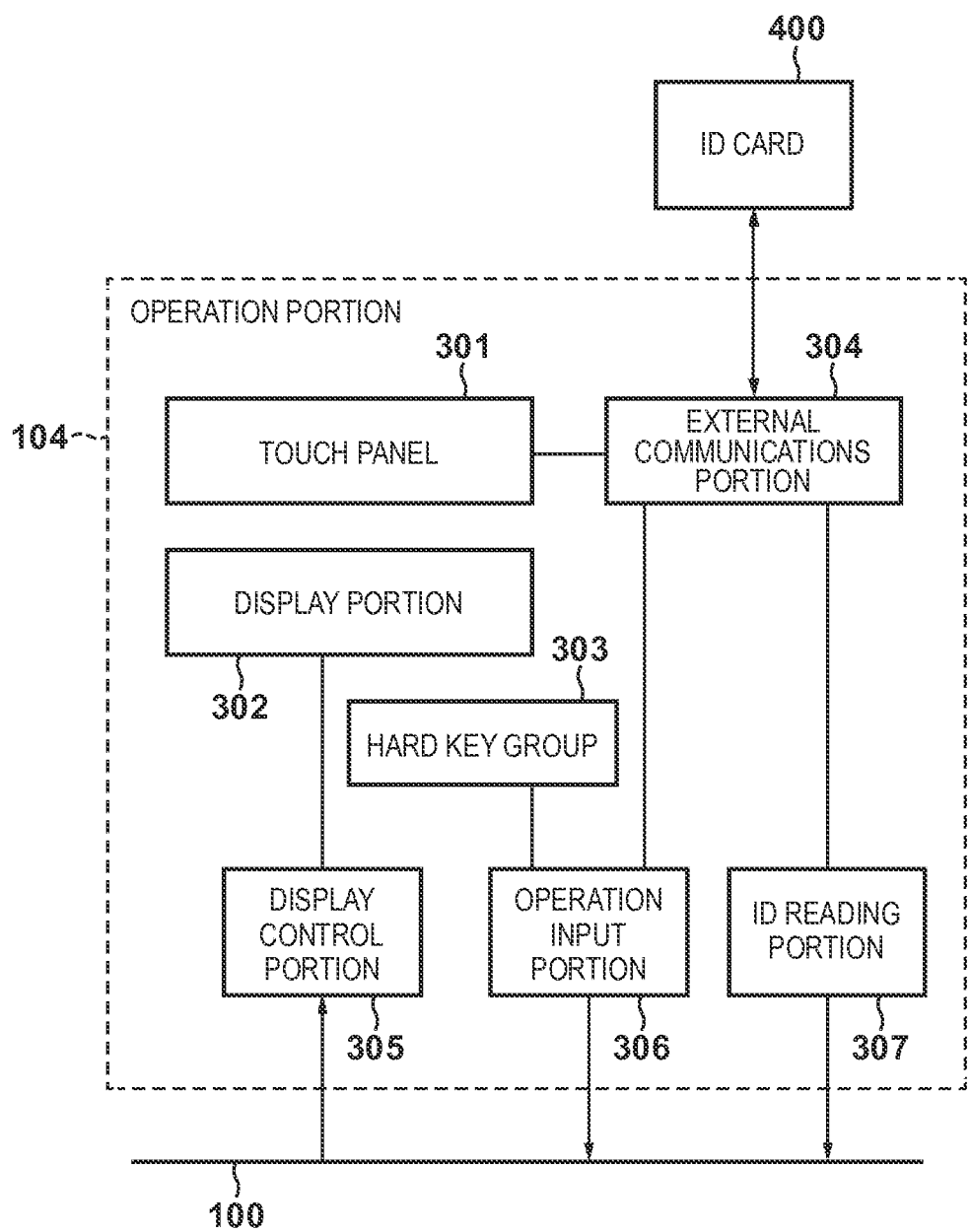
FIG. 3 is a block diagram showing an operation control portion according to an embodiment.

FIG. 3 is a block diagram showing details of the operation portion 104. A touch panel 301 and a hard key group 303 are connected to the CPU 101 through an operation input portion 306. Coordinate information indicating positions pressed on the touch panel 301 and key information corresponding to the pressing of the hard key group are inputted to the CPU 101 through the operation input portion 306. The CPU 101 recognizes from the coordinate information which touch keys have been operated. A display portion 302 is connected to the CPU 101, the ROM 102, and the RAM 103 through a display control portion 305. The ROM 102 stores data such as data for constructing settings screens for each operational mode and data for display keys and the like. The RAM 103 stores information indicating the state of the current settings. The CPU 101 selects display data of the settings screens and the display keys corresponding to the current state of the printer portion 2002 and the reader portion 2001 and to operations performed by the user on the touch panel 301 and the hard key group 303, and transfers this to the display control portion 305. The display control portion 305 sends the display data that has been sent from the CPU 101 to the display portion 302. Based on the display data, the display portion 302 displays information such as visible images. An external communications portion 304 is connected to the CPU 101, the ROM 102, and the RAM 103 through an ID reading portion 307. The external communications portion 304 carries out communications with an external communications portion 402 of an ID card 400 shown in FIG. 4, receives a user ID stored on the ID card 400, and stores the user ID in the RAM 103 via the ID reading portion 307.

Figure 4:
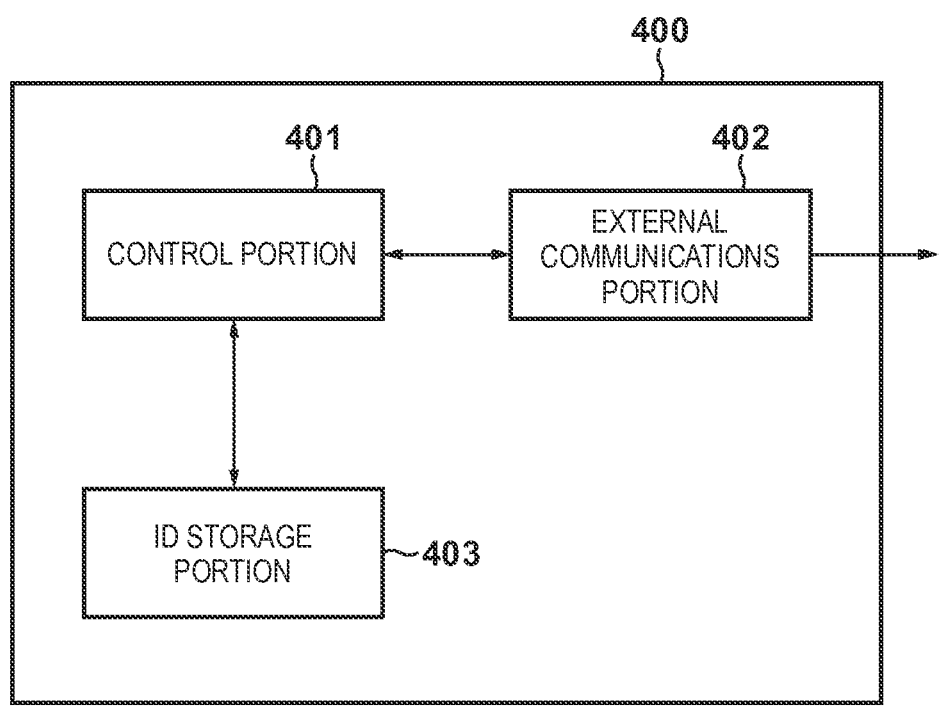
FIG. 4 is a block diagram showing an ID card according to an embodiment.

FIG. 4 is a block diagram showing a control portion of the ID card 400. The external communications portion 402 carries out communications with the external communications portion 304 of the operation portion 104. An ID storage portion 403 stores a separate user ID for each ID card. The control portion 401 reads out the user ID stored in the ID storage portion 403 when communications with the ID reading portion 307 have been established, and transmits this via the external communications portion 402. A communications standard between the external communications portion 304 and the external communications portion 402 may be a non-contact type communications standard such as Bluetooth, NFC (near field communication), ISO/IEC 14443, ISO/IEC 18092, or ISO/IEC 21481, or a contact type communications standard such as ISO/IEC 7816. It should be noted that instead of the ID card 400, a user may input identity information using a numeric keypad. Furthermore, instead of the ID reading portion 307, biometric authentication of biological information such as a fingerprint, iris, or palm vein may be employed by a biometric authentication portion reading these as user identity information.

Figure 5:
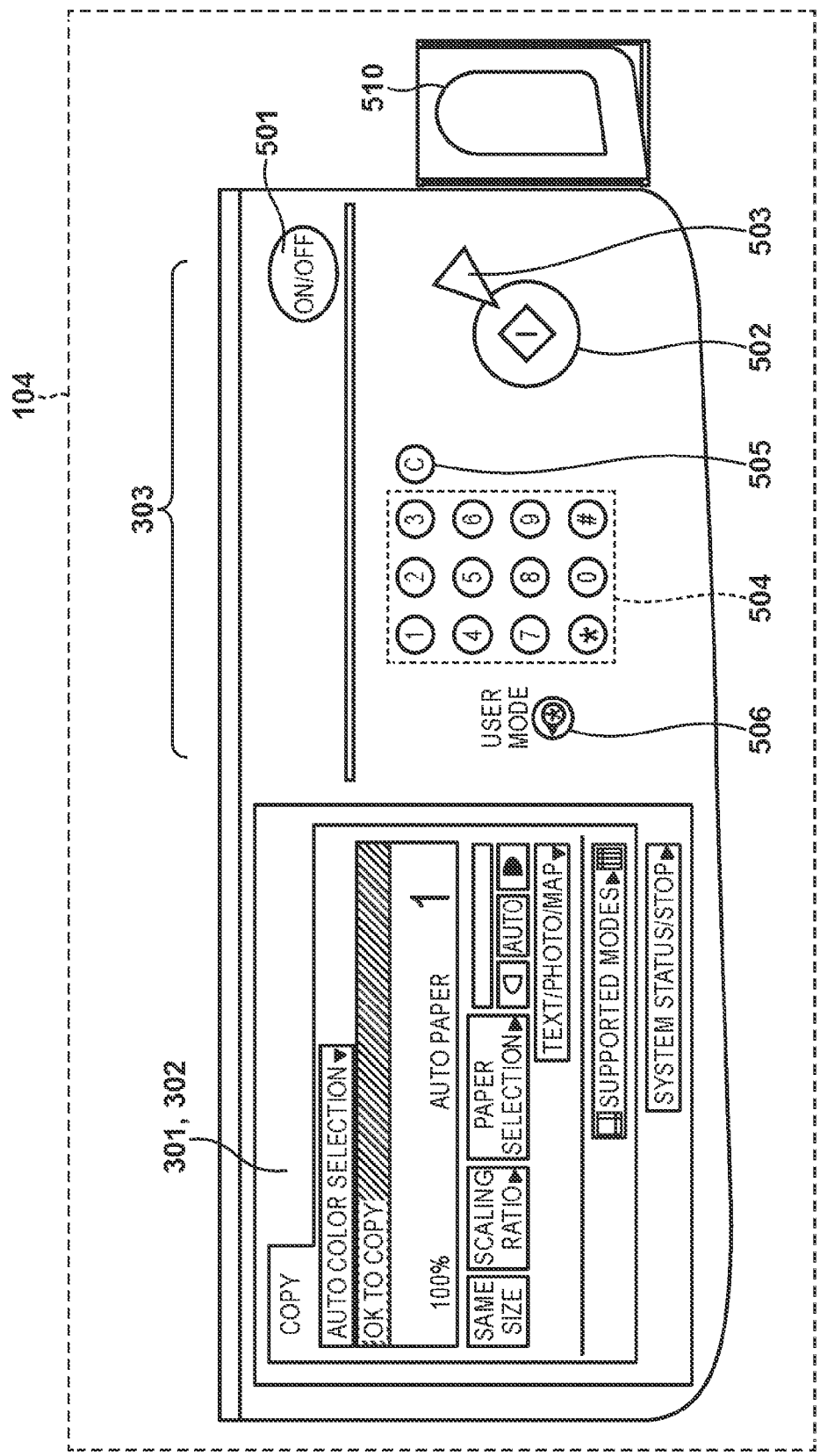
FIG. 5 is a diagram showing an operation portion according to an embodiment.

FIG. 5 shows an external view of the operation portion 104. The above-mentioned touch panel 301 and the display portion 302 are layered and integrated here. Numerous keys are provided in the hard key group 303. A power switch 501 switches on/off the power supply for the entire image forming system. A start key 502 is a key for instructing the CPU 101 to commence copying operations. A stop key 503 is a key for instructing the CPU 101 to interrupt copying operations. A numeric keypad 504 has keys for instructing the CPU 101 of the number of copies. A clear key 505 is a key for instructing the CPU 101 to return the copy mode to a standard mode from a predetermined mode. A user mode key 506 is a key for instructing the CPU 101 to transition to a user mode screen. At the user mode screen, information is displayed that indicates who has removed an original that has been left and forgotten. In the display portion 302 in FIG. 5, information, such as the paper size, the scaling ratio for copies, and the darkness of copies, which is set by the user via the touch panel 301 or the hard key group 303, is displayed. An ID authentication portion 510 corresponds to an antenna of the external communications portion 304. When an ID card 400 comes near to the ID authentication portion 510, the ID reading portion 307 controls the external communications portion 304 to communicate with the ID card 400 and receive the user ID. Upon receiving the user ID, the ID reading portion 307 references a user database stored in the ROM 102 and determines whether or not this is a proper user registered in the user database.

Next, detailed description is given regarding a feature of the present invention, which is a method of inhibiting the loss of originals that have been left and forgotten. FIG. 6 is a flowchart showing a process in which a left and forgotten original is detected and information thereof is stored. Here description is given of an example in which a first user leaves and forgets an original and a second user removes the left and forgotten original.

At step S601, the CPU 101 determines whether or not an authentication request has been received from an ID card 400 through the ID reading portion 307. As described earlier, when the first user brings the ID card 400 close to the ID authentication portion 510 of the operation portion 104, communications are established between the external communications portion 304 and the external communications portion 402 of the ID card 400. When communications are established, the control portion 401 of the ID card 400 transmits the authentication request from the external communications portion 402. The user ID read out from the ID storage portion 403 is included in the authentication request as authentication information. When the authentication request is received, the procedure proceeds to step S602.

At step S602, the CPU 101 stores the authentication information that has been received via the external communications portion 304 and the ID reading portion 307 in the RAM 103. In this way, the CPU 101, the external communications portion 304, the ID reading portion 307, and the ID authentication portion 510 function as an obtaining unit that obtains the user ID, which is identity information of the user.

FIG. 7A is a diagram showing a data structure of authentication information stored in the RAM 103 and data of the first user. User IDs included in authentication information are entered by the CPU 101 into a user ID column 701. Date data for when the authentication information was received is entered by the CPU 101 into a date column 702. Time data for when the authentication information was received is entered by the CPU 101 into a time column 703. Data 704 is one example of data of the first user. It should be noted that the CPU 101 has an inbuilt RTC (real time clock) as a timer unit and obtains date and time data from the RTC.

At step S603, the CPU 101 determines whether or not a left and forgotten original is present by checking an original detection flag, which is a variable stored in the RAM 103. Concurrent with this flowchart, the CPU 101 is executing a left and forgotten original detection process shown in FIG. 9. The CPU 101 sets and resets original detection flags in response to detection results of the original detection sensor 253 and the discharged original detection sensor 263. That is, an original detection flag indicates whether or not an original remains as it is in the reader portion 2001 after the reader portion 2001 has finished reading of an image of an original of a user who previously used the image forming system. In this way, the CPU 101 and these sensors function as an original detection unit that detects an original remaining as it is after reading of the image of the original of the user who previously used the image forming system has finished. If there is no left and forgotten original in the reader portion 2001, the procedure transitions to step S604.

Figure 8A:
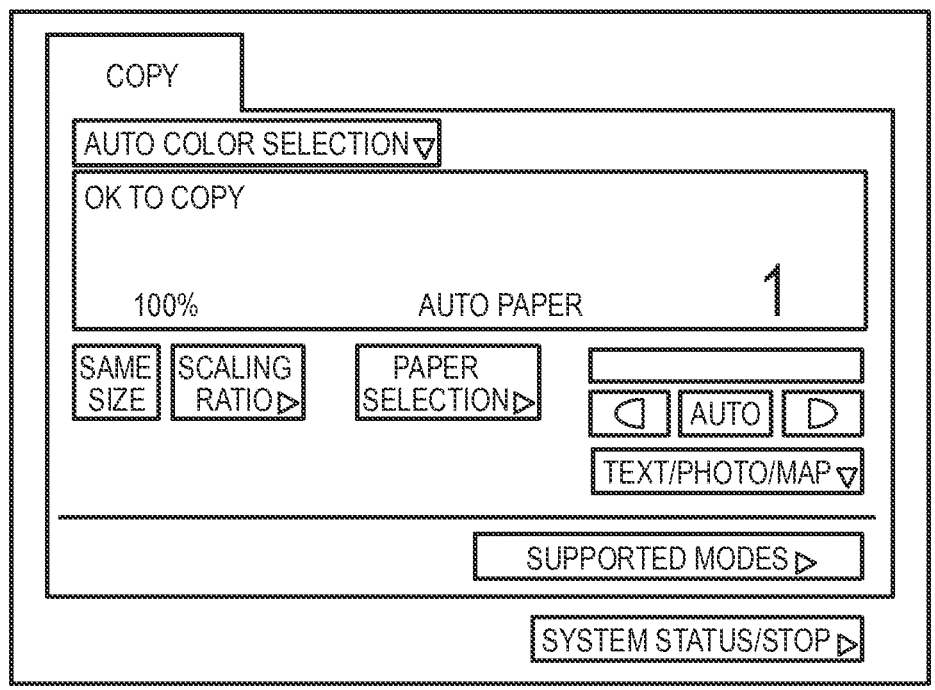

At step S604, the CPU 101 changes the copying operational status from a copying prohibited status to a copying OK status. In the copying OK status, the CPU 101 displays on the display portion 302 a message saying "OK to copy" as shown in FIG. 8A, and accepts a start instruction for a copy job from the start key 502. The first user sets the original in the reader portion, carries out various copy mode settings, and presses the start key 502.

At step S605, upon detecting the pressing of the start key 502 through the operation input portion 306, the CPU 101 executes copying. The CPU 101 instructs the reader control portion 105 to commence reading. The reader control portion 105 controls the reader portion 2001 to read an image of the original and sends image data to the image processing portion 106. The image processing portion 106 executes color space conversion processing and the like on the image data and sends this to the printer control portion 107.

The printer control portion 107 controls the printer portion 2002 to form an image corresponding to the image data on a paper.

At step S606, the CPU 101 determines whether or not the job is finished. When the printer portion 2002 outputs a signal informing that the copy job is finished, the CPU 101 determines that the copy job is finished, and the procedure proceeds to step S607. At step S607, the CPU 101 commences detecting for a left and forgotten original.

Figure 9:
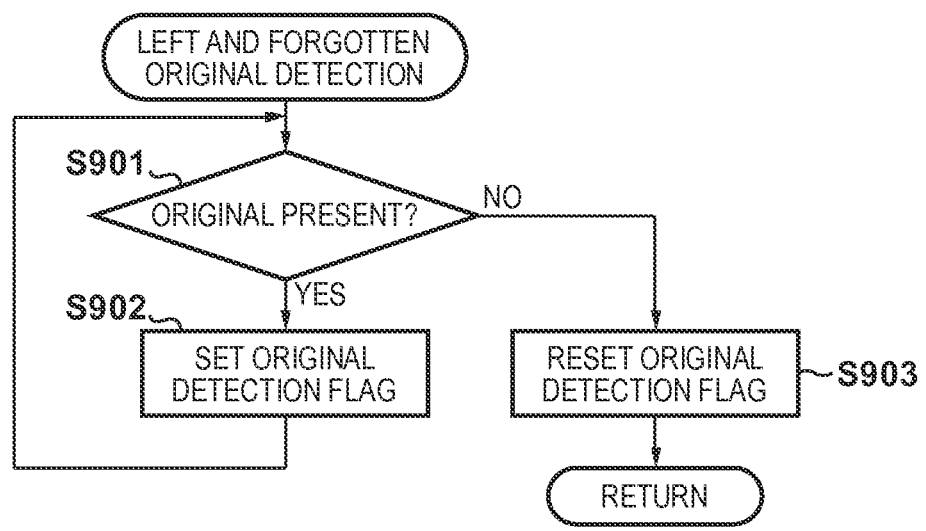
FIG. 9 is a flowchart showing a procedure for detecting an original according to an embodiment.

FIG. 9 is a flowchart showing a process of detecting a left and forgotten original at step S607. At step S901, the CPU 101 uses the original detection sensor 253 or the discharged original detection sensor 263 to determine whether or not an original is present. If a signal indicating that an original is present is being outputted by either sensor, the CPU 101 determines that an original is present and the procedure proceeds to step S902. If no original is present, the procedure proceeds to step S903. Generally in a case where an original remains as it is for more than a predetermined time from when the copy job finishes, there is a high probability that the original has been left and forgotten.

At step S902, the CPU 101 sets the original detection flag, which is a variable stored in the RAM 103, to "1" and the procedure returns to step S901. In this way, when the first user walks away from the image forming system 2000 having left and forgotten an original there, the original detection flag maintains a set state.

Again at step S901, if neither sensor is outputting a signal indicating that an original is present, the CPU 101 determines that no original is present. No original being present signifies that the original has been removed. After this, at step S903, the CPU 101 sets the original detection flag, which is a variable stored in the RAM 103, to "0" to reset the original detection flag.

Suppose that after the first user has walked away from where the image forming system is installed, a second user other than the first user approaches with an ID card 400 to use the image forming system. In this case, an authentication request of the second user is generated at step S601, and the authentication information of the second user is stored in the RAM 103 at step S602.

FIG. 7B shows the management database immediately after data 705 of the second user has been stored. E67890 is entered in the user ID column 701 of the data 705. Oct. 1, 2011 is entered in the date column 702. And 10:30 is entered in the time column 703. The CPU 101 inserts the data 705 of the second user in front of the data 704 of the first user. By doing this, the management database stores data in order of newest data. Here, the date and time data of the data 704 of the first user is the data that becomes the reference of the date and time that the original was left and forgotten. Although this does not indicate the time of the moment when the original was left and forgotten, it is a broad reference. The date and time data of the data 705 of the second user is the data that becomes the reference of the date and time that the original of the first user was removed. Although this data also does not indicate the time of the moment of removal, it is a reference allowing the time of removal to be understood.

At step S603, the CPU 101 determines whether or not a left and forgotten original is present by checking the original detection flag stored in the RAM 103. Here, the original detection flag is set due to the first user leaving and forgetting an original. Accordingly, the CPU 101 determines that a left and forgotten original is present and the procedure transitions to step S608.

Figure 8B:
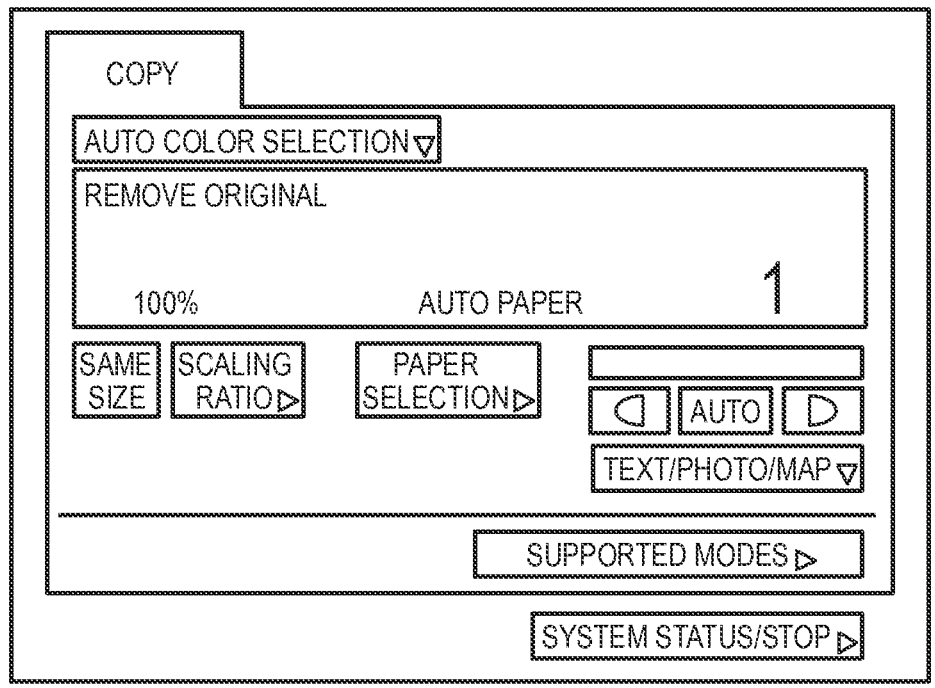

At step S608, the CPU 101 displays on the display portion 302 a message prompting the removal of the original. FIG. 8B shows one example of a message prompting removal of an original. It should be noted that this message may also be a message indicating that a left and forgotten original is present. Also note that as long as the original detection flag is set after reading by the reader portion 2001 has finished, the CPU 101 may display a message indicating that an original is present. That is, at step S902, the CPU 101 may commence to display this message and finish the display at step S903.

In a state where the original detection flag is set, the CPU 101 will not accept an instruction to start a copy job from the start key 502. That is, if the original detection flag is set, the CPU 101 prohibits image reading, image forming, and copying operations. This is because if the second user undesirably feeds originals from the ADF 260 without noticing that the original of the first user remains as it is on the original discharge tray 262, the original of the first user and the originals of the second user will become mixed undesirably. In this case, the second user may carry away the original of the first user and the originals of the second user together. Thus, it is conceivable that by prohibiting the reading of originals, it is possible to inhibit the original of the first user being carried away by the second user. In this way, the CPU 101 functions as a reading control unit that prohibits the reading of an image of an original of the second user by the reader portion 2001 when the original of the first user is detected after the user ID of the second user has been obtained.

At step S609, the CPU 101 determines whether or not the original has been removed by checking the original detection flag. If the second user removes the left and forgotten original, the procedure proceeds to step S610. Obtaining the user ID of the second user different from the first user when the original of the first user is being detected and no longer detecting the original that was remaining as it was in the reader portion 2001 is a trigger for executing storage of information of the left and forgotten original.

At step S610, the CPU 101 resets the original detection flag and stores information of the left and forgotten original in the RAM 103. FIG. 7C shows one example of a data structure and data of information of a left and forgotten original. An original ID assigned by the CPU 101 for identifying the left and forgotten original is entered in an original ID column 710. The CPU 101 allocates 1 to the original ID having the most recent leave-and-forget date and time. Original IDs are assigned in ascending order from recent leave-and-forget date and times. The user ID of the first user who has left and forgotten the original is entered by the CPU 101 into a leave-and-forget user ID column 711. The CPU 101 obtains the user ID of the first user who has left and forgotten the original from the data 704 stored second from the top in the database shown in FIG. 7B, and writes this user ID into the leave-and-forget user ID column 711. Data of a time and date to be used as a reference of the time and date the original was left and forgotten is entered into a leave-and-forget date and time column 712. The CPU 101 reads out the data of the date and time of the first user who has left and forgotten the original from the data 704 stored second from the top in the database shown in FIG. 7B, and writes this data into the leave-and-forget date and time column 712. In this way, information of the time of leaving and forgetting is entered in the leave-and-forget date and time column 712 as a reference of the time the first user left and forgot the original. The user ID of the user who has removed the left and forgotten original is entered into a removal user ID column 713. The CPU 101 obtains the user ID of the second user who has removed the left and forgotten original from the data 705 stored first from the top in the database shown in FIG. 7B, and writes this user ID into the removal user ID column 713. Data of a time and date to be used as a reference of the time and date the original was removed is entered into a removal date and time column 714. The CPU 101 reads out the data of the date and time of the second user who has removed the original from the data 705 stored first from the top in the database shown in FIG. 7B, and writes this data into the removal date and time column 714. In this way, information of the time of removal is entered in the removal date and time column 714 as a reference of the time that the original of the first user was removed from the reader portion 2001. When information of the left and forgotten original is stored in the RAM 103 at step S610, the procedure transitions to step S604, and the CPU 101 changes the operational status to the copying OK status. In this way, the RAM 103 functions as a storage unit that associates the user ID of the first user who has left and forgotten an original with the user ID of the second user who has removed this original, and stores this as information of the left and forgotten original.

Next, description is given regarding the display of information that is stored of the left and forgotten original. Upon detecting the pressing of the user mode key 506, the CPU 101 displays a menu on the display portion 302. When "display history of left and forgotten originals" is selected from the menu through the touch panel 301, the CPU 101 reads out the information of left and forgotten originals stored in the RAM 103, generates a left and forgotten original history, and displays this on the display portion 302. In this way, the display portion 302 functions as an output unit that outputs left and forgotten original information stored in the RAM 103.

FIG. 8C shows one example of a left and forgotten original history. A "No." column 801 is a column that displays numbers for differentiating originals. This number is an original ID that is read out by the CPU 101 from the original ID column 710. A leave-and-forget user name column 802 is a column that displays names of users who have left and forgotten originals. The CPU 101 references a user database shown in FIG. 7D to obtain data of the name corresponding to the leave-and-forget user ID entered in the leave-and-forget user ID column 711. As shown in FIG. 7D, the user database is provided with a user ID column 720 containing user IDs, a user name column 721 containing names of users, and a contact information column 722 containing user contact information (for example, an extension number or an email address). A contact information column 803 is a column that displays contact information of users who have left and forgotten originals. This user database, in which identity information of multiple users is associated with contact information indicating contact information of the multiple users respectively and stored, is stored in the ROM 102 or a storage device or the like on a network. The CPU 101 references the user database shown in FIG. 7D to obtain data of the contact information corresponding to the leave-and-forget user ID and displays this in the contact information column 803. A date/time column 804 is a column that displays a date and time used as a reference of the date and time the user who left and forgot the original left and forgot the original. The CPU 101 reads out data of the leave-and-forget date and time from the leave-and-forget date and time column 712 of the left and forgotten original information and displays this in the date/time column 804. A removal user name column 805 is a column that displays names of users who have removed an original. The CPU 101 references the user database shown in FIG. 7D to obtain data of the name corresponding to the removal user ID entered in the removal user ID column 713. A contact information column 806 is a column that displays contact information of users who have removed an original. The CPU 101 references the user database shown in FIG. 7D to obtain data of the contact information corresponding to the removal user ID and displays this in the contact information column 806. A removal date and time column 807 is a column that displays a date and time as a reference of the date and time the original was removed. The CPU 101 reads out data of the removal date and time from the removal date and time column 714 of the left and forgotten original information and displays this in the removal date and time column 807. A clear key 810 is a touch key for instructing the CPU 101 to clear the history. When it is detected that the clear key 810 has been pressed, the CPU 101 erases the screen display data, the leave-and-forget user IDs and the removal user IDs stored in the RAM 103.

According to the present embodiment, the image forming system displays information of left and forgotten originals when a user who has left and forgotten an original returns to where the image forming system is installed. Moreover, in the present embodiment, the user ID of the first user who has left and forgotten an original is associated with the user ID of the second user who has removed this original, and this is displayed as information of the left and forgotten original. Due to this, it is easy for the first user who has left and forgotten an original to ascertain who is the second user who has removed the original, and to inquire to the second user regarding the original. Accordingly, the loss of originals can be inhibited more than heretofore. Furthermore, by displaying removal time information as a reference of the time the original of the first user was removed, it becomes easier to recall where the second user placed the original using the removal time as a prompt. Similarly, by displaying leave-and-forget time information as a reference of the time the first user left and forgot the original, the second user will be prompted to recall where the original was placed from the leave-and-forget time. Furthermore, if contact information of the second user is displayed, the first user will be able to contact the second user promptly, and therefore the original can be discovered earlier. Furthermore, by prohibiting reading and discharging of an original of the second user by the second user when the original of the first user remains as it is on the original discharge tray 262 of the reader portion 2001, it becomes possible to avoid a situation in which the original of the first user becomes undesirably mixed with the originals of the second user. It should be noted that it is also possible for the display portion 302 to output a message indicating that a left and forgotten original is present when the sensor detects an original after reading by the reader portion 2001 has finished. Due to this, it becomes easier to inhibit each user from forgetting to take originals.

In a second embodiment, description is given regarding an image forming system that automatically displays information of left and forgotten originals when a user who has left and forgotten an original again returns to where the image forming system is installed.

FIG. 10 is a flowchart showing a process of displaying left and forgotten original information according to the second embodiment. The configuration of the image forming system and the process of holding left and forgotten original information are the same as in the first embodiment. In particular, steps S1001 and S1002 are the same processes as steps S601 and S602, and therefore description thereof is omitted.

At step S1003, the CPU 101 determines whether or not left and forgotten original information is present corresponding to a user ID contained in the authentication information. Specifically, the CPU 101 determines whether or not the user ID contained in the authentication information matches a user ID in the leave-and-forget user ID column 711 of the left and forgotten original information stored in the RAM 103. If the relevant user ID is not present in the left and forgotten original information, the CPU 101 finishes the process of displaying left and forgotten original information. On the other hand, in a case where the relevant ID is present, the procedure proceeds to step S1004.

At step S1004, the CPU 101 displays left and forgotten original information that is read out from the RAM 103. FIG. 8D shows one example of a display screen of left and forgotten original information. The CPU 101 generates a popup screen 820 in which the left and forgotten original information read out from the RAM 103 is arranged and displays this on the display portion 302. The popup screen 820 includes the aforementioned leave-and-forget date and time column 804, the name column 805 of users who have removed originals, the contact information column 806, and the removal date and time column 807. It should be noted that the original ID column 801, the leave-and-forget user name column 802, and the contact information column 803 thereof may also be provided in the popup screen 820 as shown in FIG. 8C. In this way, the display portion 302 functions as an output unit that outputs left and forgotten original information stored in the RAM 103.

At step S1005, the CPU 101 determines whether or not an OK key 811 has been touched. The OK key 811 shown in FIG. 8D is a touch key for instructing the CPU 101 to erase the popup screen 820. When the OK key 811 is pressed, the procedure proceeds to step S1006. In this way, the OK key 811 functions as an accepting unit that accepts an instruction to erase the left and forgotten original information.

At step S1006, the CPU 101 erases the popup screen 820. At step S1007, the CPU 101 erases the left and forgotten original information of the relevant user ID from the RAM 103. In this way, the RAM 103 erases the left and forgotten original information when an instruction to erase the left and forgotten original information is inputted through the OK key 811.

According to the second embodiment, left and forgotten original information is outputted when the user ID obtained by the ID reading portion 307 matches the user ID of a user who has left and forgotten an original. That is, when a user who has left and forgotten an original returns, the image forming system 2000 is capable of giving notification of the original that was left and forgotten. There is a probability that the image forming system 2000 is used by the same user a number of times in a single day. This probability is particularly high in the case of an office. Accordingly, it is conceivable that the second embodiment can very efficiently give warning to the first user regarding left and forgotten originals. Moreover, the first user who has left and forgotten an original is able to ascertain information of the second user who removed the left and forgotten original. Accordingly, the first user can inquire to the second user who removed the original as to where the original was moved, and therefore the loss of originals is inhibited more than heretofore.

The foregoing embodiments were introduced using examples in which the present invention was applied to an image forming system represented by a copier. However, the present invention can also be applied to network image scanners and standalone type image scanners. This is because there is a probability of left and forgotten originals occurring in these image scanners also. Furthermore, the present invention can also be applied to facsimile machines. This is because facsimile machines are also provided with reader portions, and therefore there is a probability of left and forgotten originals.

Furthermore, data of the date and time the first user executed authentication using his or her user ID was employed as an example of leave-and-forget time information in the embodiments. However, any information that is understandable to the user as a reference of the time the left and forgotten original occurred is sufficient as the leave-and-forget time information. Consequently, information indicating any time within a range from the time when the user ID of the first user was obtained to the time when the reader portion 2001 has read an image of the original of the first user is sufficient in the leave-and-forget time information. Similarly, information indicating any time within a range from the time when the user ID of the second user was obtained to the time when an image of the original of the second user was read is sufficient in the removal time information. This is because an approximate date and time the second user was involved with the original of the first user are sufficient as long as these are ascertainable by the first user and the second user. Furthermore, the left and forgotten original information is erased when an instruction to erase left and forgotten original information is accepted. That is, the system waits for an explicit erasure instruction before erasing the left and forgotten original information, and therefore this prevents inadvertent deletion of the left and forgotten original information. In the foregoing embodiments, an example was given in which the left and forgotten original information was displayed on the display portion 302. However, the CPU 101 may also output the left and forgotten original information by sending the left and forgotten original information to an email address in the contact information obtained from the user database. The left and forgotten original information may also be outputted through audio.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-195347, filed Sep. 7, 2011, which is hereby incorporated by reference herein in its entirety.

What is claimed is:

1. An image reading apparatus comprising:
   an obtaining unit configured to obtain identity information of a user;
   an image reading unit configured to read an image of an original after the obtaining unit has obtained the identity information of the user;
   a discharge unit configured to discharge the original from which an image has been read by the image reading unit;
   an original detection unit configured to detect the original that is placed in the discharge unit or the image reading unit;
   a timer unit;
   a storage unit configured to store, as left and forgotten original information, identity information of a first user, identity information of a second user, leave-and-forget time information as a reference of a time the first user left and forgot the original and removal time information as a reference of a time the original of the first user was removed from the image reading unit, wherein the identity information of the first user is obtained by the obtaining unit prior to the original detection unit detecting the original, the identity information of the second user is obtained by the obtaining unit during the original detection unit detecting the original, the leave-and-forget time information is obtained from the timer unit and the removal time information is obtained from the timer unit; and
   an output unit configured to output the left and forgotten original information stored in the storage unit.

2. The image reading apparatus according to claim 1, wherein the original detection unit, after the image reading unit has finished reading the image of the original of the first user, detects the original of the first user that remains as it is in the image reading unit, and
   the storage unit stores the left and forgotten original information when identity information of a second user different from the first user is obtained by the obtaining unit when the original detection unit is detecting the original of the first user, and the original remaining as it is in the image reading unit is no longer detected.

3. The image reading apparatus according to claim 1, wherein the leave-and-forget time information is information indicating any time within a range from a time when the identity information of the first user was obtained by the obtaining unit to a time when the image reading unit has read an image of the original of the first user.

4. The image reading apparatus according to claim 1, wherein the removal time information is information indicating any time within a range from a time when the identity information of the second user was obtained by the obtaining unit to a time when the image reading unit has read an image of the original of the second user.

5. The image reading apparatus according to claim 1, further comprising a user database in which identity information of multiple users is associated and stored with contact information indicating contact information of the multiple users respectively,
   wherein the output unit reads out contact information corresponding to the identity information of the first user from the user database and outputs this with the left and forgotten original information.

6. The image reading apparatus according to claim 5, wherein the output unit reads out contact information corresponding to the identity information of the second user from the user database and outputs this with the left and forgotten original information.

7. The image reading apparatus according to claim 1, further comprising a reading control unit configured to prohibit reading of an image of an original of the second user by the image reading unit when an original of the first user is detected by the original detection unit after the identity information of the second user has been obtained by the obtaining unit.

8. The image reading apparatus according to claim 1, further comprising a determination unit configured to determine whether or not identity information of a user obtained by the obtaining unit matches the identity information of the user who has left and forgotten an original contained in the left and forgotten original information stored in the storage unit,
   wherein the output unit outputs the left and forgotten original information when the identity information of a user obtained by the obtaining unit matches the identity information of the user who has left and forgotten an original contained in the left and forgotten original information stored in the storage unit.

9. The image reading apparatus according to claim 1, wherein the original detection unit detects an original present on a platen where originals are placed or a discharge platen that holds originals discharged after reading by the image reading unit has finished.

10. The image reading apparatus according to claim 1, wherein when the original detection unit is detecting the original after reading by the image reading unit has finished, the output unit outputs a message indicating that a left and forgotten original is present.

11. The image reading apparatus according to claim 1, further comprising an accepting unit configured to accept an instruction to erase the left and forgotten original information,
   wherein the storage unit erases the left and forgotten original information when the accepting unit accepts the instruction to erase the left and forgotten original information.

12. An image forming system comprising:
   an image reading apparatus configured to read an image of an original, and
   an image forming apparatus configured to form on a sheet of paper the image obtained by the image reading apparatus,
   wherein said image reading apparatus includes:
   an obtaining unit configured to obtain identity information of a user;
   an image reading unit configured to read an image of an original after the obtaining unit has obtained the identity information of the user;
   a discharge unit configured to discharge the original from which an image has been read by the image reading unit;
   an original detection unit configured to detect the original that is placed in the discharge unit or the image reading unit;
   a timer unit;
   a storage unit configured to store, as left and forgotten original information, identity information of a first user, identity information of a second user, leave-and-forget time information as a reference of a time the first user left and forgot the original and removal time information as a reference of a time the original of the first user was removed from the image reading unit, wherein the identity information of a first user is obtained by the obtaining unit prior to the original detection unit detecting the original, the identity information of a second user is obtained by the obtaining unit during the original detection unit detecting the original, the leave-and-forget time information is obtained from the timer unit and the removal time information is obtained from the timer unit; and
   an output unit configured to output the left and forgotten original information stored in the storage unit.

* * * * *